United States Patent
Chang

(10) Patent No.: US 10,369,415 B2
(45) Date of Patent: Aug. 6, 2019

(54) RESISTANCE SENSING MECHANISM FOR EXERCISE EQUIPMENT

(71) Applicant: Rexon Industrial Corp., Ltd., Taichung (TW)

(72) Inventor: Yao-Jen Chang, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 317 days.

(21) Appl. No.: 15/498,599

(22) Filed: Apr. 27, 2017

(65) Prior Publication Data
US 2017/0312581 A1    Nov. 2, 2017

(30) Foreign Application Priority Data
Apr. 29, 2016   (TW) .............................. 105113439 A

(51) Int. Cl.
| A63B 24/00 | (2006.01) |
| A63B 21/22 | (2006.01) |
| A63B 22/06 | (2006.01) |
| G01D 5/14 | (2006.01) |
| A63B 71/06 | (2006.01) |

(Continued)

(52) U.S. Cl.
CPC ...... *A63B 24/0087* (2013.01); *A63B 21/0051* (2013.01); *A63B 21/00069* (2013.01); *A63B 21/225* (2013.01); *A63B 22/0605* (2013.01); *A63B 71/0622* (2013.01); *G01D 5/145* (2013.01); *A63B 2220/20* (2013.01); *A63B 2220/80* (2013.01)

(58) Field of Classification Search
CPC .......... A63B 24/0087; A63B 21/00069; A63B 21/0051; A63B 21/225; A63B 22/0605; A63B 71/0622; A63B 2220/20; A63B 2220/80; G01D 5/145
See application file for complete search history.

(56) References Cited

U.S. PATENT DOCUMENTS

| 8,950,276 B2 | 2/2015 | Wu | |
| 2010/0009815 A1* | 1/2010 | Chen | A63B 21/00069 482/63 |

(Continued)

FOREIGN PATENT DOCUMENTS

TW    M435942 U1    8/2012

*Primary Examiner* — Jermele M Hollington
*Assistant Examiner* — Feba Pothen
(74) *Attorney, Agent, or Firm* — Bacon & Thomas, PLLC

(57) ABSTRACT

A resistance sensing mechanism includes a resistance adjusting unit including a holder frame, a locating sleeve disposed above the holder frame, an adjustment screw rod rotatably inserted through the locating sleeve and a first screw nut threaded onto a first thread segment of the adjustment screw rod and pivotally connected to the holder frame, and a sensor unit including a linkage pivotally connected to the holder frame, a second screw nut threaded onto a second thread segment of the adjustment screw rod and pivotally connected to the linkage, a sensor mounted at one of the holder frame and the linkage and a sensible member mounted at the other of the holder frame and the linkage to face toward the sensor. Subject to the relative movement between the first and second screw nuts, the holder frame and the linkage relatively biased to change the distance between the sensor and sensible member.

5 Claims, 3 Drawing Sheets

(51) Int. Cl.
*A63B 21/005* (2006.01)
*A63B 21/00* (2006.01)

(56) References Cited

U.S. PATENT DOCUMENTS

2010/0234185 A1\* 9/2010 Watt ................... A63B 21/0051
  482/8
2016/0310785 A1\* 10/2016 Lo ........................ A63B 21/005

\* cited by examiner

RESISTANCE SENSING MECHANISM FOR EXERCISE EQUIPMENT

BACKGROUND OF THE INVENTION

1. Field of the Invention

The present invention relates to exercise equipment technology and more particularly, to a resistance sensing mechanism for use in an exercise equipment.

2. Description of the Related Art

In order to allow the user to easily adjust the operation of an exercise machine according to personal training needs, the exercise equipment is generally equipped with a damping resistance adjuster. Through the damping resistance adjuster, the user can adjust the damping resistance to the flywheel or other similar elements. Further, in order to allow the user to accurately control the resistance given by the damping resistance adjuster during the adjustment operation, some exercise equipments may be configured to provide a sensing mechanism for sensing the degree of resistance given by the damping resistance adjuster. Subject to the detection of the sensing mechanism, the user can adjust the damping resistance at the appropriate time.

In the prior art relating to the sensing mechanism, Taiwan Patent No. M435942 discloses a torque sensing mechanism that includes a main sensor and a sensible member respectively provided on a locating member and a position adjusting member, and an adjustment screw rod rotatable to change the relative distance between the locating member and the position adjusting adjustment, causing a change in the distance between the main sensor and the sensible member and further generation of a corresponding sensing signal indicative of such a distance change. However, according to this prior art patent design, the main sensor is movable but the sensible member is immovable, thus, it takes too much time to achieve one detection operation. So, in actual operation, it is likely that the detection of the resistance causes an inconvenience to the user.

SUMMARY OF THE INVENTION

The present invention has been developed in view of the above identified circumstances. It is one of the main objects of the present invention to provide a resistance sensing mechanism for exercise equipment, which can effectively reduce the itinerary of action and shorten the sensing time, thereby increasing the ease of operation.

To achieve this and other objects of the present invention, a resistance sensing mechanism comprises a resistance adjusting unit and a sensor unit. The resistance adjusting unit comprises a holder frame, a locating sleeve, an adjustment screw rod and a first screw nut. The holder frame is disposed around an outer perimeter of a flywheel. The locating sleeve is disposed above the holder frame. The adjustment screw rod has a double-threaded shank axially inserted through the locating sleeve and rotatable in situ relative to the locating sleeve, comprising a first thread segment and a second thread segment extended in reversed directions. The first screw nut is threaded onto the first thread segment of the double-threaded shank of the adjustment screw rod. The sensor unit comprises a linkage, a second screw nut, a sensor and a sensible member. The linkage has one end thereof pivotally connected to the holder frame of the resistance adjusting unit. The second screw nut is threaded onto the second thread segment of the double-threaded shank of the adjustment screw rod and pivotally connected to the linkage. The sensor is mounted at one of the holder frame of the resistance adjusting unit and the linkage of the sensor unit. The sensible member is mounted at the other of the holder frame of the resistance adjusting unit and the linkage of the sensor unit to face toward the sensor and sensible by said sensor.

As can be seen from the above, the resistance sensing mechanism utilizes the arrangement of the reversely extended first and second thread segments for causing the first and second screw nuts to move the sensor and the sensible member toward or away from each other, changing the distance between the sensor and the sensing member and generation of a corresponding sensing signal, and thus, the present invention can effectively achieve the effects of reducing the itinerary of the action and shortening the sensing time.

Other advantages and features of the present invention will be fully understood by reference to the following specification in conjunction with the accompanying drawings, in which like reference signs denote like components of structure.

DETAILED DESCRIPTION OF THE INVENTION

Figure 1:
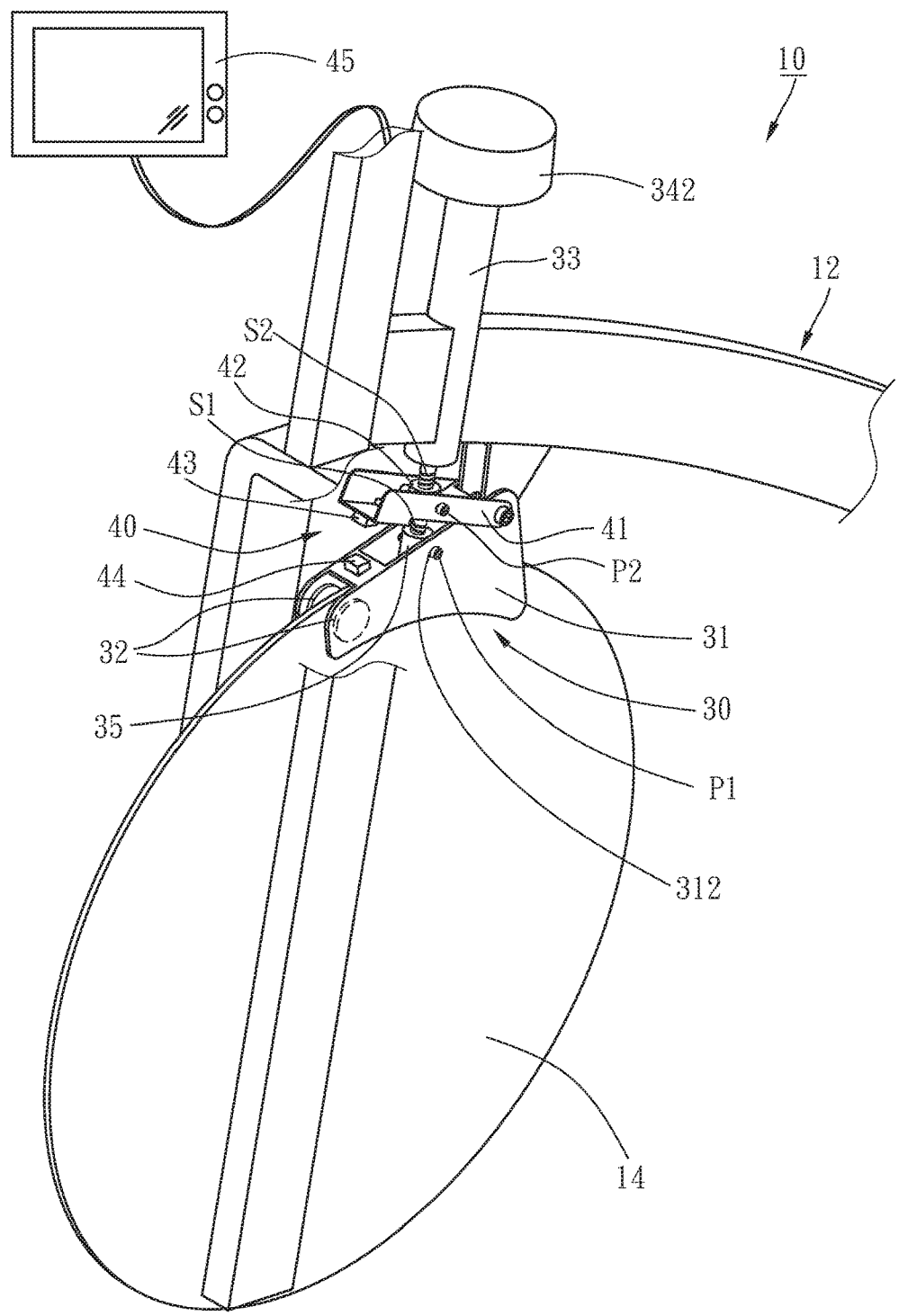
FIG. 1 is an oblique top elevational view of a resistance sensing mechanism used in an exercise equipment in accordance with the present invention.

Referring to FIG. 1, a resistance sensing mechanism 10 for exercise equipment in accordance with the present invention is shown. The exercise equipment comprises a bicycle frame 12 and a flywheel 14 rotatably mounted at the bicycle frame 12. The resistance sensing mechanism 10 comprises a resistance adjusting unit 30 and a sensor unit 40.

The resistance adjusting unit 30 comprises a holder frame 31, two opposing magnetic members 32, a locating sleeve 33, an adjustment screw rod 34, and a first screw nut 35. The holder frame 31 is pivotally connected with a rear end thereof to the bicycle frame 12, having two elongated slots 312 respectively cut through two opposite sidewalls thereof. The magnetic members 32 are bilaterally mounted in the holder frame 31 and respectively spaced from the flywheel 14 by a distance. The locating sleeve 33 is affixed to the bicycle frame 12 and disposed above the holder frame 31. The adjustment screw rod 34 comprises a rotary knob 342, and a double-threaded shank 344 fixedly connected with the rotary knob 342. The double-threaded shank 344 is inserted through the locating sleeve 33 and can be rotated in situ, comprising a first thread segment S1 and a second thread segment S2. The first thread segment S1 and the second thread segment S2 extend in reversed directions. The first screw nut 35 is threaded onto the first thread segment S1 of the double-threaded shank 344 of the adjustment screw rod 34, having two opposite lateral sides thereof respectively pivotally connected to the holder frame 31 by a respective first pivot pin P1. The first pivot pins P1 are respectively slidably inserted through the respective elongated slots 312 of the holder frame 31.

The sensor unit 40 comprises a linkage 41 and a second screw nut 42. The linkage 41 has one end thereof, namely, the rear end coaxially and pivotally connected with the holder frame 31 to the bicycle frame 12. The second screw nut 42 is threaded onto the second thread segment S2 of the double-threaded shank 344 of the adjustment screw rod 34, having two opposite lateral sides thereof respectively pivotally connected to a middle part of the linkage 41 by a respective second pivot pin P2. The sensor unit 40 further comprises a sensor 43 and a sensible member 44. The sensor 43 can be, for example, a Hall sensor selectively mounted at a top side of the holder frame 31 or a bottom side of the linkage 41, and the sensible member 44, which can be, for example, a magnet, is selectively mounted at the bottom side of the linkage 41 or the top side of the shell of the holder frame 31 to face toward the sensor 43. If the sensor 43 is mounted at the top side of the holder frame 31, the sensible member 44 should be mounted at the bottom side of the linkage 41. On the contrary, if the sensor 43 is mounted at the bottom side of the linkage 41, the sensible member 44 should be mounted at the top side of the holder frame 31. In either of the aforesaid two selective mounting arrangements, the sensor 43 and the sensible member 44 must be arranged to face toward each other.

Figure 2:
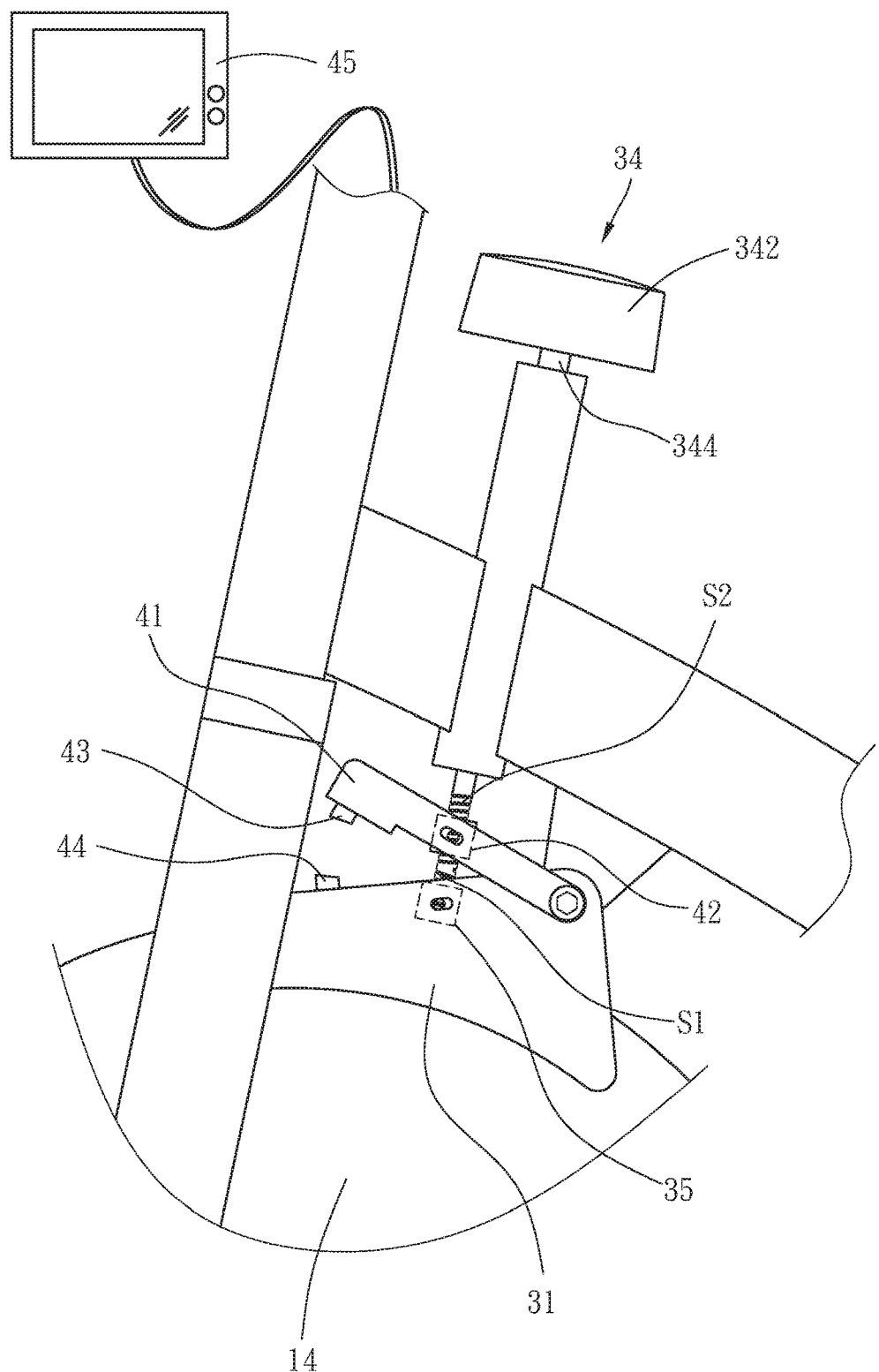
FIG. 2 is a plain view of the preferred embodiment of the present invention, illustrating the sensor and sensible member of the resistance sensing mechanism moved far from each other.
Figure 3:
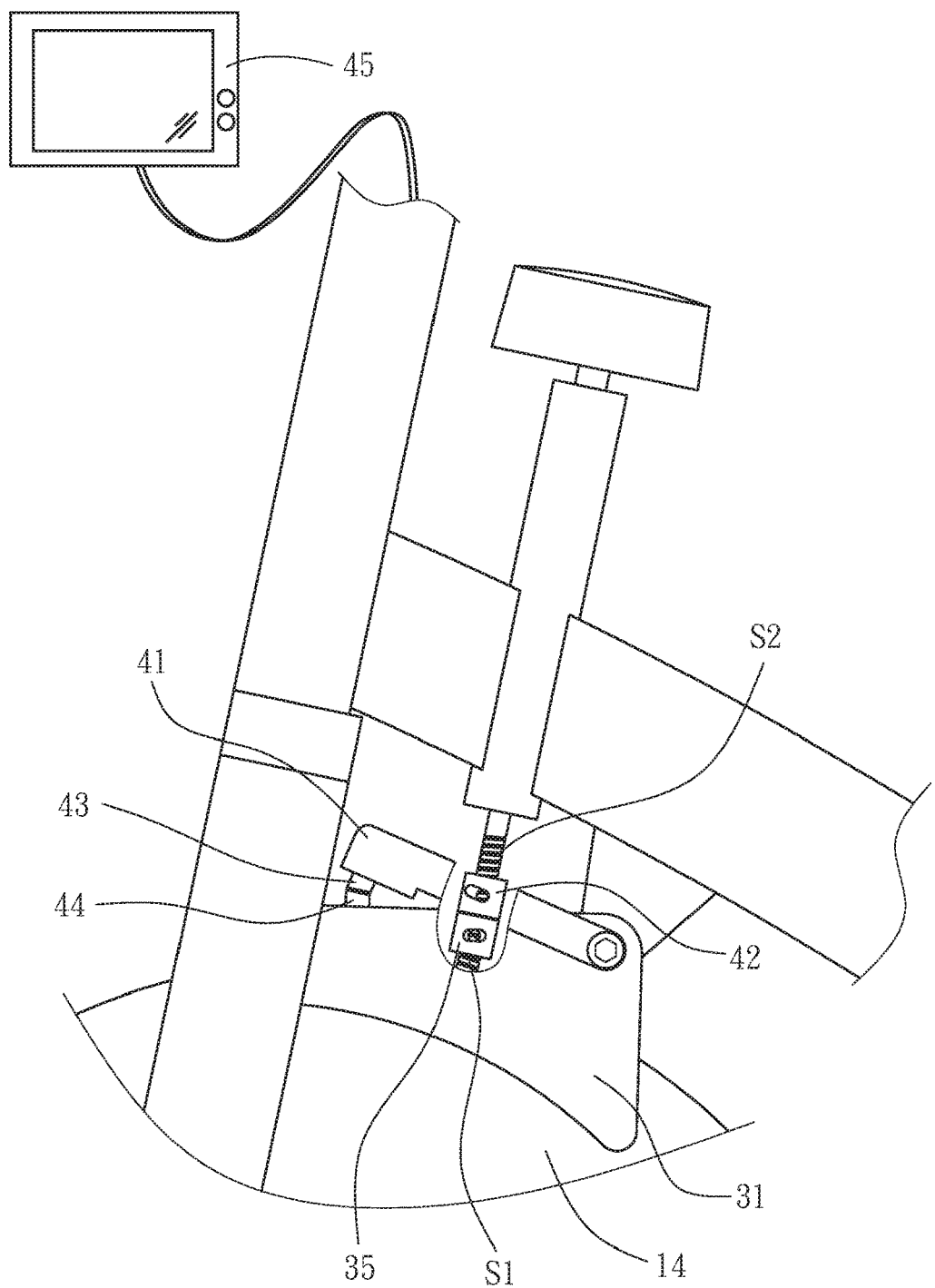
FIG. 3 is similar to FIG. 2, illustrating the sensor and sensible member of the resistance sensing mechanism moved toward each other.

As illustrated in FIGS. 2 and 3, when operating the rotary knob 342 to rotate the adjustment screw rod 34 clockwise or counter-clockwise, the first thread segment S1 and second thread segment S2 of the double-threaded shank 344 of the adjustment screw rod 34 will cause the first screw nut 35 and the second screw nut 42 to move upward or downward along the adjustment screw rod 34. During displacement of the first screw nut 35, the first screw nut 35 drives the holder frame 31 to bias relative to the flywheel 14, causing a change in the magnetic flux between the two magnetic members 32 to provide a damping resistance to the flywheel 14. Further, during displacement of the second screw nut 42, the second screw nut 42 drives the linkage 41 to bias relative to the holder frame 31. Due to the first thread segment S1 and the second thread segment S2 extending in reversed directions, the first screw nut 35 and the second screw nut 42 will be forced to move toward or away from each other upon rotation of the adjustment screw rod 34, and thus, the holder frame 31 and the linkage 42 will be respectively moved with the first screw nut 35 and the second screw nut 42 to bias toward or away from each other. Accordingly, by means of the relative movement between the holder frame 31 and the linkage 41, the distance between the sensor 43 and the sensible member 44 is relatively changed. Once the distance between the sensor 43 and the sensible member 44 is changed, the sensor 43 provides a relative sensing signal to a control panel 45 so that the user can see the resistance changes based on the message displayed on the control panel 45.

In conclusion, the resistance sensing mechanism 10 utilizes the arrangement of the reversely extended first and second thread segments S1, S2 for causing the first and second screw nuts 35, 42 to move the sensor 43 and the sensible member 44 toward or away from each other. When compared to prior art techniques of unilateral action, the present invention can effectively achieve the effects of reducing the itinerary of the action and shortening the sensing time.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A resistance sensing mechanism used in an exercise equipment comprising a bicycle frame and a flywheel rotatably mounted at said bicycle frame, the resistance sensing mechanism comprising:

a resistance adjusting unit comprising a holder frame configured to be pivotally connected with one end thereof to said bicycle frame and disposed around an outer perimeter of said flywheel, a locating sleeve configured to be affixed to said bicycle frame and disposed above said holder frame, an adjustment screw rod having a double-threaded shank axially inserted through said locating sleeve and rotatable in situ relative to said locating sleeve, said double-threaded shank comprising a first thread segment and a second thread segment extended in reversed directions, and a first screw nut threaded onto said first thread segment of said double-threaded shank of said adjustment screw rod; and a sensor unit comprising a linkage, a second screw nut, a sensor and a sensible member, said linkage having one end thereof pivotally connected to said holder frame of said resistance adjusting unit, said second screw nut being threaded onto said second thread segment of said double-threaded shank of said adjustment screw rod and pivotally connected to said linkage, said sensor being mounted at one of said holder frame of said resistance adjusting unit and said linkage of said sensor unit, said sensible member being mounted at the other of said holder frame of said resistance adjusting unit and said linkage of said sensor unit to face toward said sensor to be sensible by said sensor.

2. The resistance sensing mechanism as claimed in claim 1, wherein said holder frame comprises two elongated slots respectively and symmetrically located in two opposite lateral sides thereof, and two pivot pins respectively slidably inserted through said elongated slots to pivotally connect said first screw nut to said holder frame.

3. The resistance sensing mechanism as claimed in claim 1, wherein said sensor is mounted at said holder frame and said sensible member is mounted at said linkage.

4. The resistance sensing mechanism as claimed in claim 1, wherein said sensor is mounted at said linkage and said sensible member is mounted at said holder frame.

5. The resistance sensing mechanism as claimed in claim 1, wherein said sensor is a Hall sensor and said sensible member is a magnet.

* * * * *